(12) United States Patent
Lohmann (10) Patent No.: US 9,889,894 B2
(45) Date of Patent: Feb. 13, 2018

(54) INDUSTRIAL TRUCK INCLUDING A TRAVELLING DRIVER STAND PLATFORM (71) Applicant: Jungheinrich Aktiengesellschaft, Hamburg (DE)

(72) Inventor: Helmut Lohmann, Gyhum (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 68 days.

(21) Appl. No.: 15/052,436

(22) Filed: Feb. 24, 2016

(65) Prior Publication Data
US 2016/0244109 A1 Aug. 25, 2016

(30) Foreign Application Priority Data
Feb. 24, 2015 (DE) .......... 10 2015 102 584

(51) Int. Cl.
*B62D 51/00* (2006.01)
*B62D 51/02* (2006.01)
*B66F 9/075* (2006.01)

(52) U.S. Cl.
CPC ........... *B62D 51/005* (2013.01); *B62D 51/00* (2013.01); *B62D 51/02* (2013.01); *B66F 9/0759* (2013.01)

(58) Field of Classification Search
CPC ...... B62D 51/00; B62D 51/005; B62D 51/02; B66F 9/0759
See application file for complete search history.

(56) References Cited

U.S. PATENT DOCUMENTS

| 3,774,711 | A | * | 11/1973 | Lacey | B60N 2/502 108/136 |
| 5,297,645 | A | * | 3/1994 | Eckersley | B60K 1/04 180/68.5 |
| 5,918,693 | A | * | 7/1999 | Mantovani | B62B 3/0612 180/89.13 |
| 7,497,505 | B2 | | 3/2009 | Manci et al. | |
| 8,414,065 | B2 | * | 4/2013 | Jones, Jr. | B62D 51/005 296/190.01 |
| D756,589 | S | * | 5/2016 | Knie | D34/34 |
| 2004/0004349 | A1 | * | 1/2004 | Swetish | B62D 1/043 280/779 |
| 2006/0255622 | A1 | * | 11/2006 | Manci | B62D 51/005 296/190.01 |
| 2007/0207024 | A1 | * | 9/2007 | Kraimer | B60N 2/24 414/685 |

(Continued)

FOREIGN PATENT DOCUMENTS

DE 9300762 3/1993
DE 4214788 2/1995
(Continued)

*Primary Examiner* — Barry Gooden, Jr.
(74) *Attorney, Agent, or Firm* — Barclay Damon LLP (57) ABSTRACT An industrial truck with a drive part having a driver stand assembly. The driver stand assembly includes an L-shaped stand platform with a horizontally arranged floor element and a vertical wall element. The vertical wall element has a switching lever positioned on it which interacts with the spring element in a first switching position and is freely movable relative to the spring element in a second switching position, wherein in the first switching position, a spring force of the spring element acts by means of the switching lever on the stand platform.

18 Claims, 9 Drawing Sheets (56) References Cited

U.S. PATENT DOCUMENTS

| | | | | |
|---|---|---|---|---|
| 2011/0260502 A1* | 10/2011 | Yahner | ............... | B62D 33/0604 |
| | | | | 296/190.07 |
| 2012/0239238 A1* | 9/2012 | Harvey | ................ | G05D 1/0221 |
| | | | | 701/25 |
| 2015/0060199 A1* | 3/2015 | Overfield | ................ | B66F 9/105 |
| | | | | 182/69.4 |
| 2016/0214840 A1* | 7/2016 | Schuler | .................... | B60K 1/04 |
| 2016/0221810 A1* | 8/2016 | Schueler | ................... | B62B 3/06 |
| 2016/0244109 A1* | 8/2016 | Lohmann | ............. | B62D 51/005 |
| 2016/0244110 A1* | 8/2016 | Lohmann | ............. | B62D 51/005 |
| 2017/0008742 A1* | 1/2017 | Hohmann | .......... | B62D 33/0604 |
| 2017/0158474 A1* | 6/2017 | Standard | ................. | B66F 9/065 |

FOREIGN PATENT DOCUMENTS

| | | |
|---|---|---|
| DE | 19524075 | 1/1997 |
| DE | 10055263 | 5/2002 |
| DE | 69632505 | 5/2005 |
| DE | 10360298 | 7/2005 |
| DE | 60117956 | 11/2006 |
| DE | 102005045505 | 3/2007 |
| DE | 102006009330 | 9/2007 |
| DE | 102006009331 | 9/2007 |
| DE | 102009058598 A1 | 6/2011 |
| EP | 0449029 A1 | 10/1991 |
| EP | 1172285 A2 | 1/2002 |
| EP | 2336010 A1 | 6/2011 |
| WO | 2006118925 A2 | 11/2006 |

\* cited by examiner

INDUSTRIAL TRUCK INCLUDING A TRAVELLING DRIVER STAND PLATFORM

CROSS REFERENCE TO RELATED APPLICATION

This application is based upon and claims priority under relevant sections of 35 USC §119 to German Patent Application No. 10 2015 102 584.1, filed Feb. 24, 2015, the entire contents of which are hereby incorporated by reference.

BACKGROUND OF THE INVENTION

The present invention relates to an industrial truck with a drive part having a driver stand.

When traveling on uneven ground, a spring-suspended stand platform is very comfortable. A large, vertical spring excursion decouples the stand platform from the vehicle to provide a form of suspension. If the suspension is too soft, a greater spring excursion results which can be interpreted by the driver as being too long (i.e. too bouncy). Furthermore, the driver stand should offer effective suspension for drivers with a bodyweight between 50 kg and 150 kg. The driver at the bottom limit of the weight range should experience appropriate suspension comfort, as well as the driver at the top end of the weight range. Depending on the type and position of the weight bearing down on the stand platform, a large swinging movement by the platform arises over the spring excursion. If the standing surfaces are very wide, lateral swinging and tilting can occur. If the stand platform is frequently mounted and dismounted, the lateral swinging is felt to be unsafe and unstable by vehicle drivers.

A standing surface for a standing driver of an industrial truck was disclosed in DE 42 14 788 C2. The standing surface includes a platform which is supported by at least one elastically yielding buffer element fixed to the vehicle, wherein a flexible section of a reinforced sheet metal plate on one end is securely connected to the part fixed to the vehicle, and the buffer element abuts the other end of the sheet metal plate.

A spring-suspended driver platform is known from DE 103 60 298 A1 in which the stand platform is spring-suspended by a spring element and additionally dampened by a damping element.

A floor panel for a stand platform of an industrial truck is known from DE 10 2005 045 505 A1. The floor panel is pivotably mounted and pretensioned by a spring in an elevated position, wherein a proximity sensor is arranged below the floor panel. A switching pin is arranged on the bottom side of the floor panel such that it triggers a switching process by overlapping the proximity sensor when the floor panel swings downward against the force of the spring.

DE 10 2006 009 330 A1 discloses a stand platform for a lift truck in which the standing surface is formed by a top floor panel which is mounted in an articulating manner to a bottom floor panel, and is dampened at its opposing end by spring and/or damping elements.

A stand platform for a lift truck is known from DE 10 2006 009 331 A1 which has a spring-suspended standing surface for an operator, wherein the standing surface is formed by a top floor panel which is mounted in an articulated manner to a bottom panel. A spring element is arranged between the floor panels and pretensions the top floor panel upward relative to the bottom panel. The top floor panel can be moved downward by the weight of an operator against the force of the spring element, wherein a position sensor is provided for recognizing the position of the top floor panel.

An industrial truck is known from U.S. Pat. Nos. 7,497,505 and 8,414,065 in which the height of a spring-mounted floor element can be adjusted by a scissors gear. A resilient effect arises from pretensioned spring elements which engage with and hold in position the scissors gear or floor panel. With the known method, lateral instability of the floor platform and the significantly limited weight range proved to be disadvantageous.

BRIEF SUMMARY OF THE INVENTION

The current application discloses a spring-suspended driver stand assembly for an industrial truck or machine where the driver stand remains stable over the entire excursion or displacement of the spring and can provide sufficient suspension for users of a variety of weight ranges.

According to one embodiment, the spring-suspended driver stand assembly possesses an L-shaped platform having a horizontally arranged floor element and a vertical wall element. The floor element is movably mounted to a portion of the frame of the drive part by means of a swing arm. The vertical wall element includes at least one coupling element which is securely connected to the vehicle and acts on the movement of the floor element. Furthermore, at least one spring element and one switching lever arranged on the vertical wall element are provided. In a first switching position, the switching lever and spring element interact or coact with each other. In a second switching position, the switching lever and spring element can move freely relative to each other. In the first switching position, a spring force of the spring element interacting with the switching lever may act via the switching lever bearing on the vertical wall of the L-Shaped platform. By engaging, or respectively disengaging a spring element via a switching lever, the suspension can be easily adapted to the body weight of an operator. In addition, the floor element mounted on a swing arm enables sufficient guide rigidity so that a user can safely use the driver stand.

In another embodiment, the stand platform is spring-mounted via the swing arm (and a coupling element) and, independent of the engageable spring element, via a suspension. The suspension generates the spring force for the platform, in particular when no spring elements are engaged.

In another embodiment, the coupling element is a guide roller. The coupling element connects the stand platform and the vertical wall element to the industrial truck, vehicle or machine. This produces a substantially vertical movement of the stand platform. The guide roller preferably rolls on a guide affixed to the vehicle and limits the movement of the stand platform to a substantially vertical, movement.

In another embodiment, two or more switching levers with their respective spring elements are provided such that each switching lever can be moved into its switching position independent of the position of the other switching levers. By combining a plurality of spring elements, it is possible to set a desired spring force with a plurality of spring elements. The spring forces of the spring elements may be equivalent to one another or they may be different.

In another embodiment, one or more of the switching levers has a catch such that one or more adjacent switching levers are entrained. By entraining adjacent switching levers, the operating effort and adjustment of the desired spring force are significantly simplified as movement of one switching lever will automatically move an adjacent, entrained switching lever.

In another embodiment, the switching lever contacts a latching projection, such that in the first switching position, a switching arm of the switching lever contacts the associated spring element so that the spring element is compressed by a resilient movement of the swing arm. The switching lever includes an adjusting arm that interacts with an associated spring element of the switching lever in the first switching position. When the switching lever is moved together with the vertical wall element as a result of movement of the stand platform, the adjusting arm presses against the spring element and generates a spring force.

In another embodiment, the spring elements are designed as pneumatic springs with a defined initial tension, a flat characteristic and a compact design.

In another embodiment, the swing arm has at least one sidearm which is articulated at one end to the frame affixed to the vehicle, or directly to the frame of the drive part, and the other end articulated to the floor element. At its end extending away from the wall element, the at least one sidearm of the swing arm is articulated to the floor element. The stand platform is deflected by a weight on the floor element such that the spring element is compressed and initiates a resilient movement of the floor element when the switching lever is in the first switching position.

In another embodiment, the swing arm possesses at least two side arms that are connected to each other by a transverse arm. The use of two side arms on the swing arm with the transverse arm yields the advantage that the floor element cannot tip to the side. In other embodiments, the traverse arm may be torsion-resistant.

In still another embodiment, a guide element is coupled to the vehicle by a pair of side legs that form the guide for the guide roller. When coupled to the vehicle, the guide element may face the side of the floor element such that, upon actuation of the swing arm, the guide roller experiences a force exerted on the guide element.

In an embodiment, a position sensor interacts with the vertical wall element and/or the coupling element. The coupling element may be a guide roller or its bearing axle positioned below the position sensor. In an embodiment, the position sensor can use the guide roller to detect if weight is being exerted on the floor element. If no weight is being exerted, then the spring elements are unloaded and the guide roller is located in a position detectable by the position sensor. In this context, the position sensor can detect the position of the roller, or a bearing of the guide roller.

In another embodiment, the position sensor is configured to generate a deadman signal when it detects the position of an unloaded spring element. The deadman signal ensures that a vehicle control element recognizes when a vehicle driver has left his stand.

In another embodiment, a second spring element is provided that is coupled to the vehicle on the side of the floor element facing the vertical wall element. This second spring element interacts with the floor element and ensures that a resilient effect is achieved even when none of the spring elements are engaged by the switching lever. In this embodiment, the position sensor is configured so that the position of the guide roller is detected when the floor element is not subject to a load.

BRIEF DESCRIPTION OF THE DRAWINGS

A preferred exemplary embodiment of the invention is explained in greater detail below. In the figures.

DETAILED DESCRIPTION OF THE INVENTION

Figure 1:
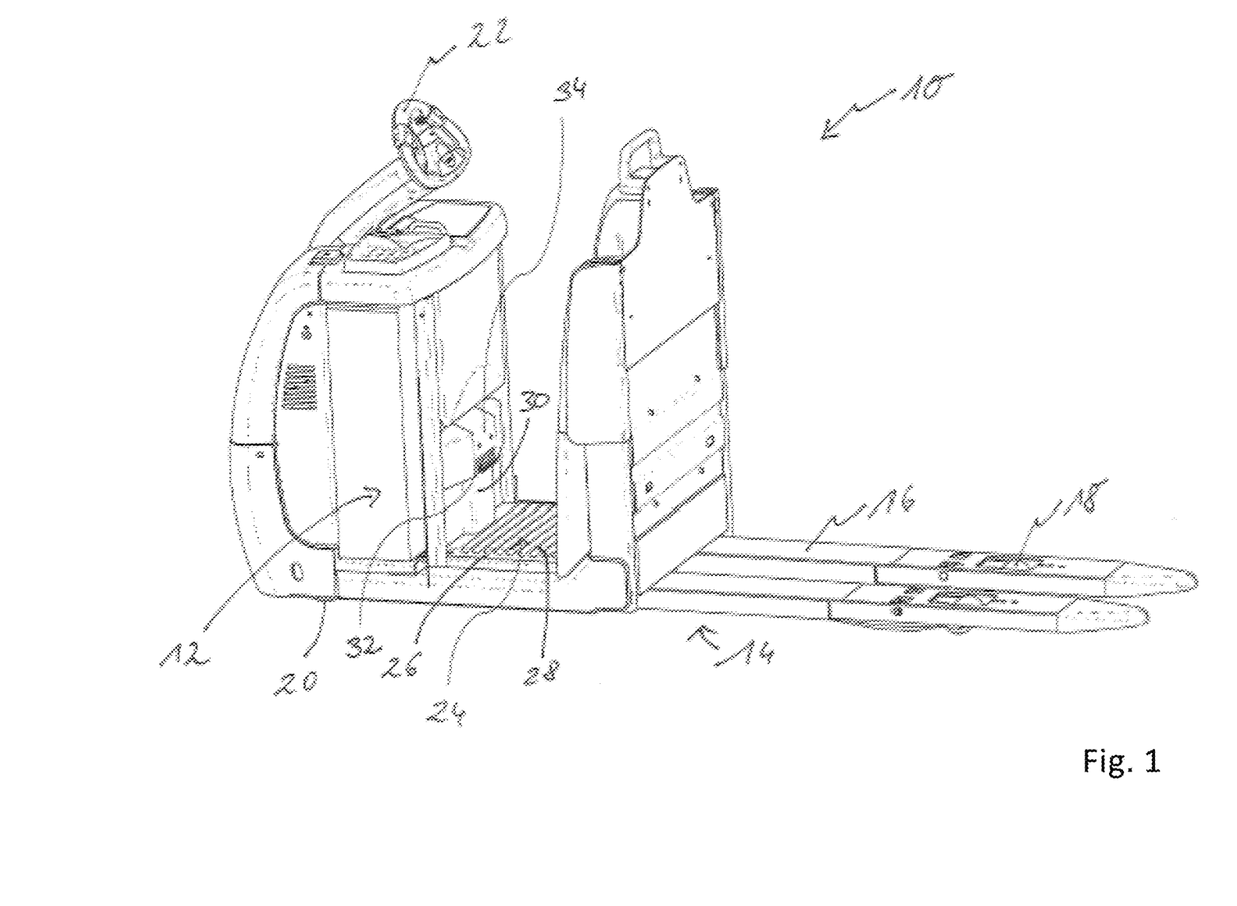
FIG. 1 shows a perspective view from the side of an industrial truck fitted with a spring-suspended driver stand assembly.

FIG. 1 shows an industrial truck 10 which has a drive part 12 and a load part 14. The load part 14 has a pair of fork arms 16 which are supported by load rollers 18. The drive part 12 includes at least one wheel 20 as well as an operating element 22 to control some or all of the functions. The drive part 12 also includes a driver stand assembly 21. The driver stand assembly has a floor element 26 with a pressure-sensitive mat 28 and a vertical wall element 30 connected to the floor element. As shown, switching levers 32 are provided centrally on the vertical wall element 30 and are partially covered by a cover 34.

Figure 2:
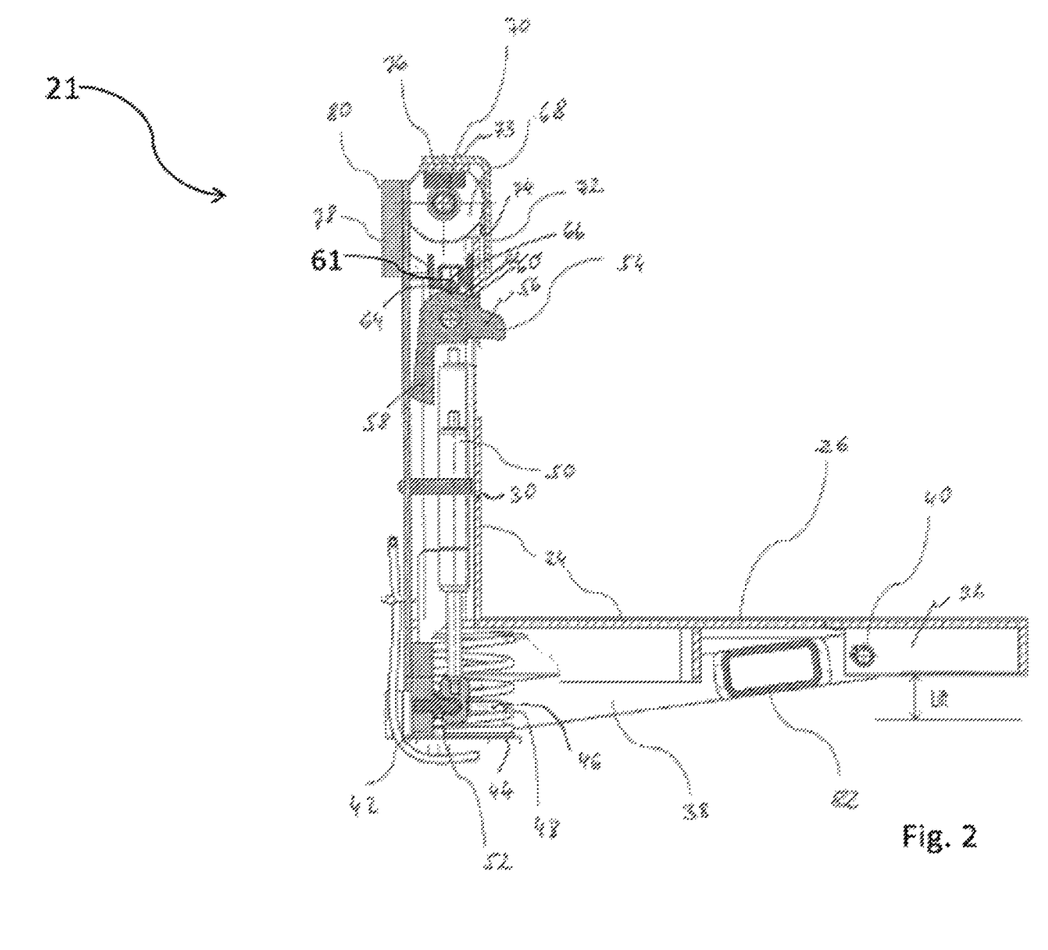
FIG. 2 shows a cross-sectional view of the stand platform with an unengaged spring element in an unloaded position.

FIG. 2 shows a cross-sectional view of the driver stand assembly. In an embodiment, the floor element 26 is coupled to the wall element 30 to form an L-shaped stand platform 24. In a connecting area 36 on the bottom side of the floor element 26, a sidearm 38 is pivotably coupled to the floor element 26 at a bearing site 40. In the present depiction, the pivot point of the sidearm 38 is located below the floor element and may be at least partially covered.

FIG. 2 also depicts a lower frame section of a frame 42 on which a horizontal flange 44 is provided. The horizontal flange 44 includes a projection 46 on which a spring element 48 is arranged. The spring element 48 abuts the horizontal flange 44 and contacts the bottom side of the floor element 26. A pneumatic spring 50 is mounted via a ball-and-socket joint 52 to the lower frame section 42. The pneumatic spring 50 may be engaged and disengaged by one or more switching levers 54. The switching lever 54 is mounted on the wall element 30. The switching lever 54 includes an actuating section 56, an adjusting arm 58 and a switching surface 60 which is formed by two switching recesses 62 and 64. A pressure piece 66 is also arranged on the wall element 30 and engages in the switching recesses 62, 64 in order to lock the respective switching positions. A spring-mounted ball 61 is located in the pressure piece. The lower frame section 42 may be mounted on a vehicle frame, or it may be a component of the vehicle frame. A vertical flange surface 78 of an upper frame 80 section can, for example, be used for an installation on a vehicle frame.

Still referring to FIG. 2, the end of the wall element 30 projecting away from the floor element 26 includes a guide roller 68 which is rotatably mounted on a bearing axle 70. The guide roller 68 contacts a guide element 72, which provides a wall-element-facing guide 74 for the guide roller 68. A top tongue 73 forms a stop for the lifting movement and limits the path of the guide roller 68.

As shown in the embodiment of FIG. 2, a position sensor 76 is attached above the guide roller 68 and interacts with the guide roller 68, or respectively its bearing axle 70, in order to detect the unloaded position of the driver stand assembly 21 as depicted in FIG. 2.

Figure 3:
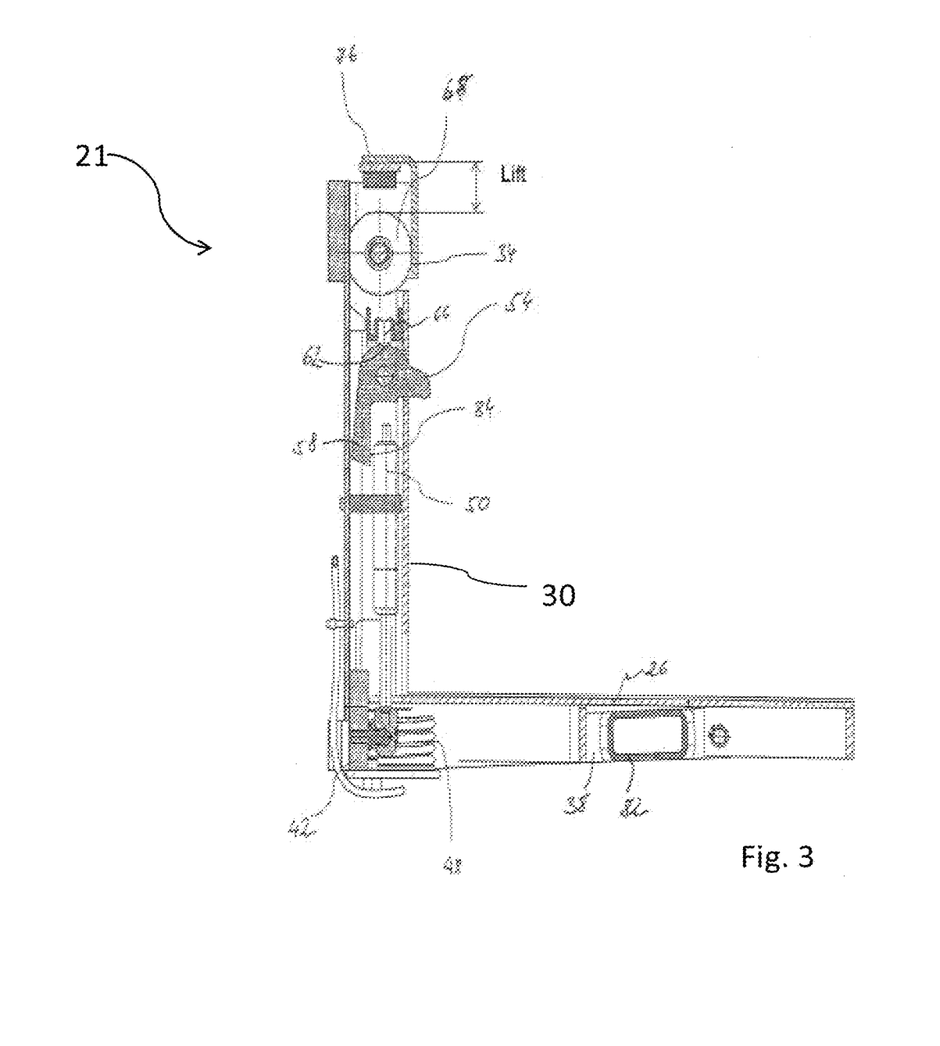
FIG. 3 shows the cross-sectional view from FIG. 2 in a loaded position.

FIG. 3 shows the driver stand assembly 21 in its loaded position. As shown, the transverse arm 82 of the sidearm 38 runs substantially or nearly parallel to the floor element 26, and the spring element 48 is in a compressed state. In addition, the vertical wall 30 has moved in the direction of the stroke or LIFT so that the guide roller 68 is at a distance from the position sensor 76. The stroke drawn in FIG. 3 corresponds to the stroke from FIG. 2 due to the approximately linear movement of the floor element 26.

As shown in FIG. 3, the adjusting arm 58 of the switching lever 54 travels past the pneumatic spring 50, such that a gap 84 is maintained. Accordingly, the pneumatic spring 50 does not contribute to the cushioning of the floor element 26, but rather only supports the spring 48 element.

FIGS. 2 and 3 show a switching lever 54 which is located in its second switching position such that it does not actively interact with the pneumatic spring 50 and the pressure piece 66 is in the second switching recess 62.

Figure 4:
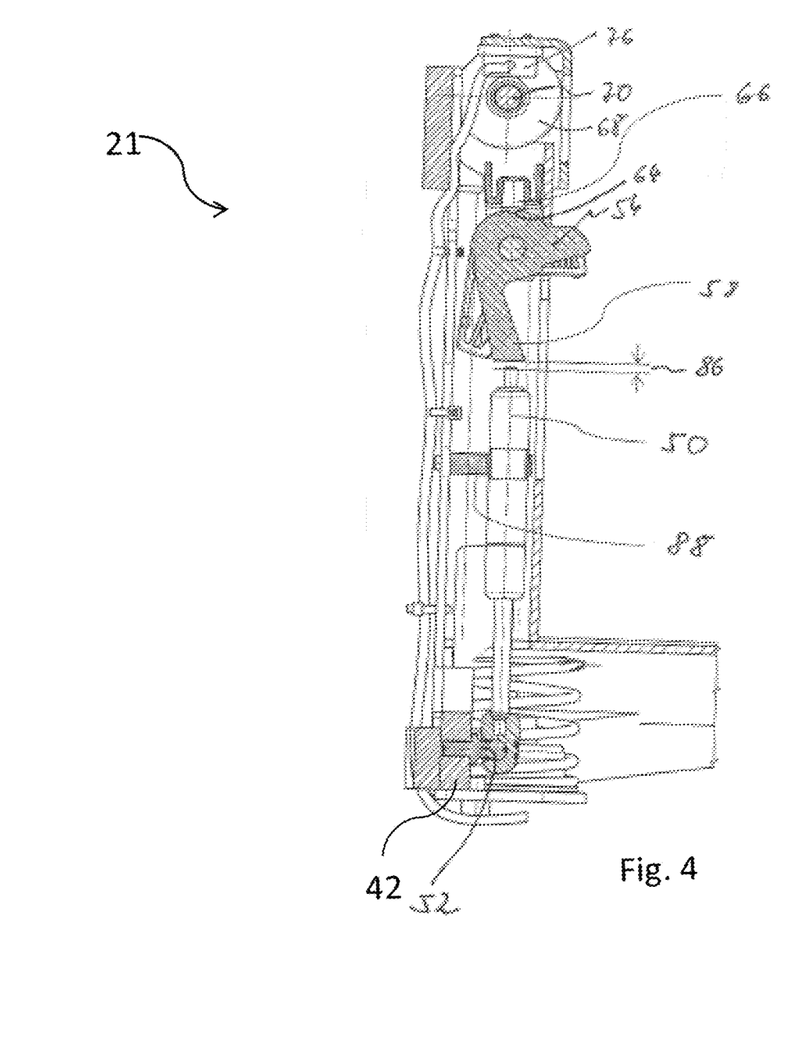
FIG. 4 shows a cross-sectional view of the lifting platform with an engaged spring element and unloaded driver stand.
Figure 5:
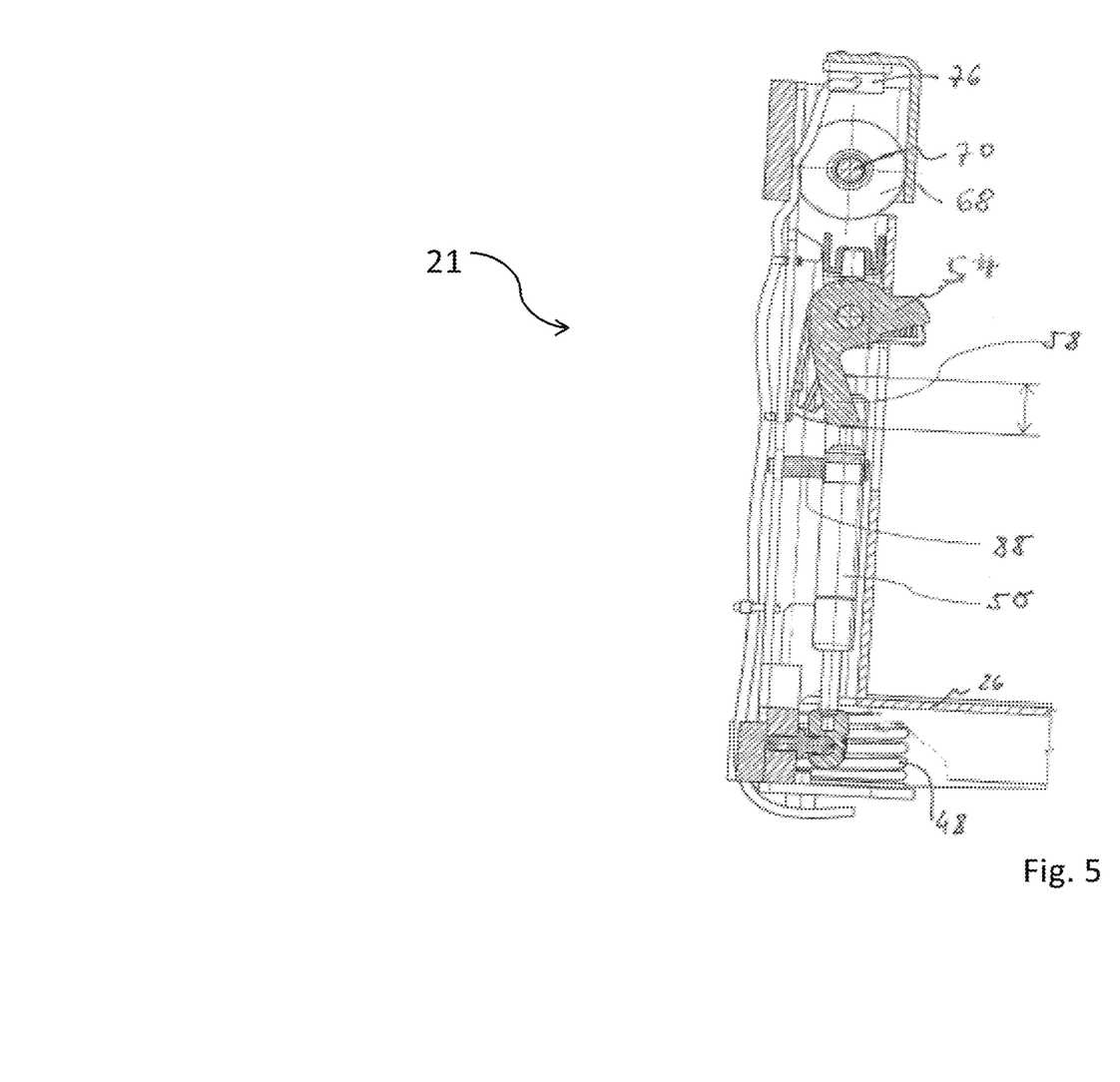
FIG. 5 shows the cross-sectional view from FIG. 4 in a loaded position.

FIGS. 4 and 5 show the switching lever 54 in a first switching position such that the pressure piece 66 is located in the first switching recess 64. FIG. 4. shows the unloaded position in which the adjusting arm 58 is positioned above the pneumatic spring 50, wherein a distance 86, designated a no-load stroke, occurs. The no-load stroke 86 makes it possible to pivot the switching lever 54 when the stand platform 24 is in an unloaded state.

As shown, the pneumatic spring 50 is retained by a guide rail 88 so as to be linearly displaceable. It is connected to the lower frame section 42 by means of the ball-and-socket joint 52. As shown in FIG. 5, both the spring element 48 and pneumatic spring 50 are compressed by a weight on the floor element 26. The switching lever 54 which, along with its adjusting arm 58, is entrained along with the wall element 30 to execute a lifting movement relative to the uncompressed pneumatic spring. When a load is exerted on the floor element 26, the spring forces of the spring element 48 and the pneumatic spring 50 add together.

Figure 6:
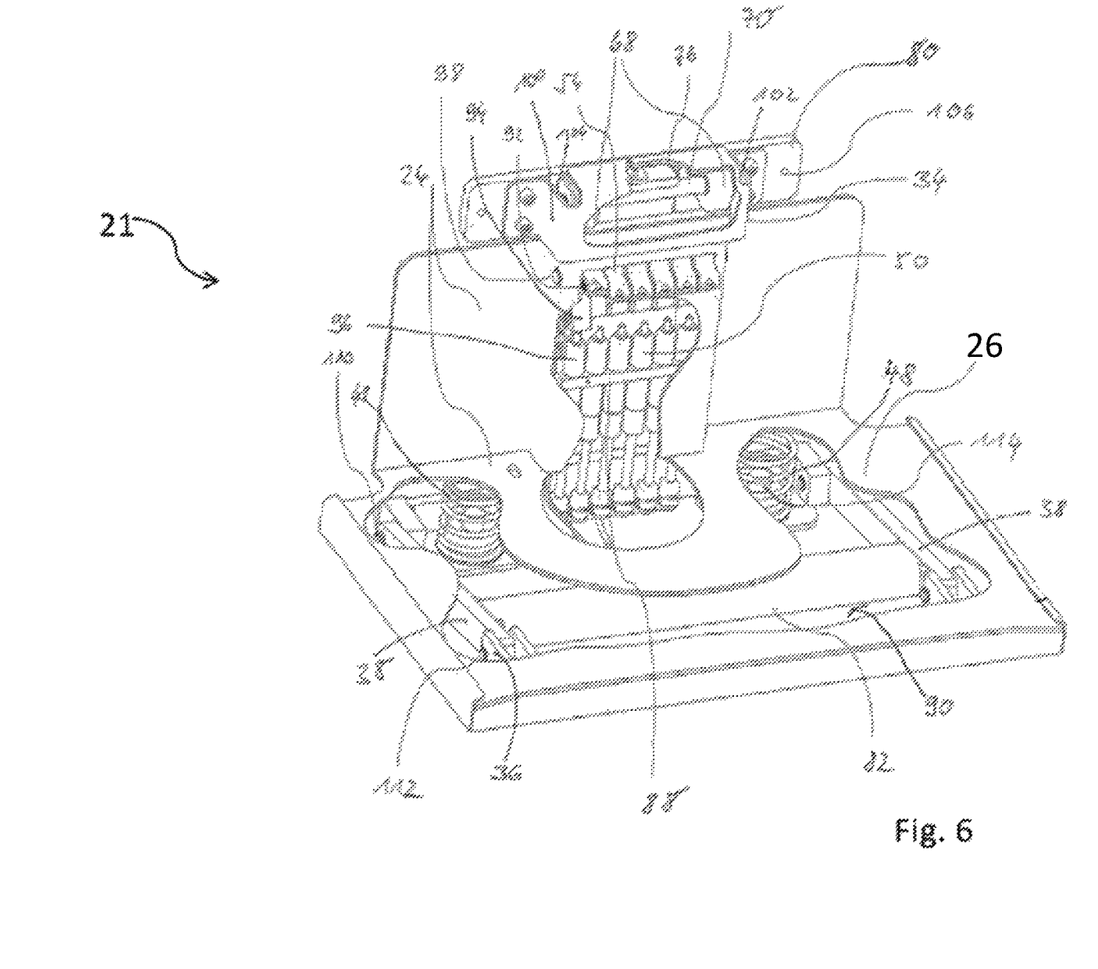
FIG. 6 shows a perspective view of the spring-suspended driver stand assembly with a partially cutaway floor and vertical wall element in an unloaded state.

Referring to FIG. 6, the swing arm 90 is equipped with sidearms 38 and a transverse arm 82. As shown in this embodiment, six pneumatic springs 50 are arranged on the guide rail 88. The pneumatic springs 50 each possess a switching lever 54 configured to engage each corresponding pneumatic spring 50. Switching lever 92 is for example located in its activated, i.e., first switching position in which the spring force of pneumatic spring 96 acts on the stand platform 24. The switching lever 54 with switching lever 92 are jointly mounted on a bearing shaft 98 and pivot about the bearing shaft.

Still referring to FIG. 6, the guide element 100 includes two side legs 102, 104 by means of which the guide element 100 can be fastened to the upper frame section 80. The upper frame section 80 may be fixed to a vehicle frame in the area of the guide element through bore holes 106. Two guide rollers 68 are arranged on a common bearing axle 70 and are retained or housed by the guide element 100. The position sensor 76 is mounted on the guide element 100 above the bearing axle 70.

As shown in FIG. 6, the four bearing points 110 for the swing arm 90 are positioned below the wall element 30 and are located approximately in the area of the spring element 48 on the end of the sidearm 38 facing the wall element 30. The other end of the sidearm 38 has a bearing point 112 in which the sidearm 38 is pivotably connected to the connection area 36 of the floor element 26.

Figure 7:
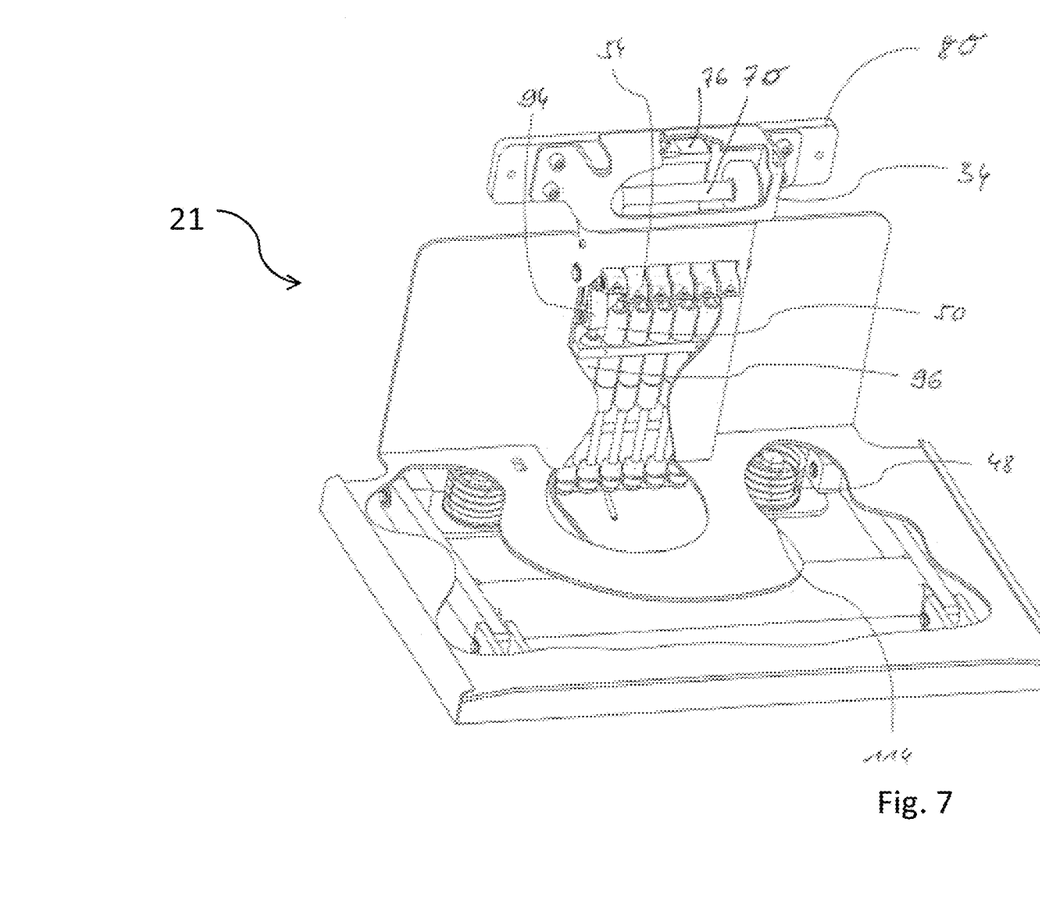
FIG. 7 shows the perspective view from FIG. 6 in a loaded state.

FIG. 7 shows the loaded position of the stand platform 24 from FIG. 6. As shown, adjusting arm 94 actuates pneumatic spring 96, whereas the other pneumatic springs 50 are not actuated due to the position of their switching levers 54. The spring element 48 is compressed and a buffer element 114 forms a stop at the bottom stroke end in the interior of the spring element 48, and intercepts a potential overloading of the floor element. As shown in FIG. 7, when the driver stand assembly 21 is in the loaded position, there is a greater distance from the position sensor 76 to the bearing axis 70.

Figure 8:
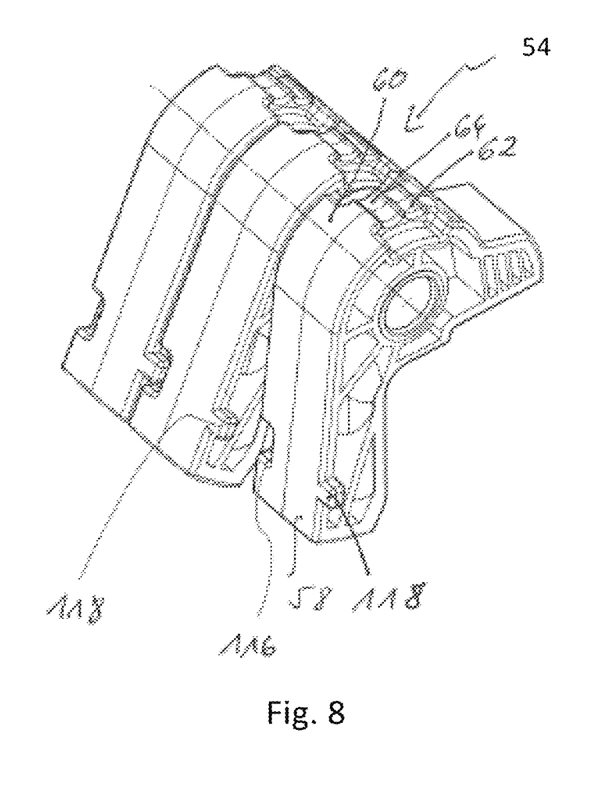
FIG. 8 shows a perspective view from the side of three switching levers.
Figure 9:
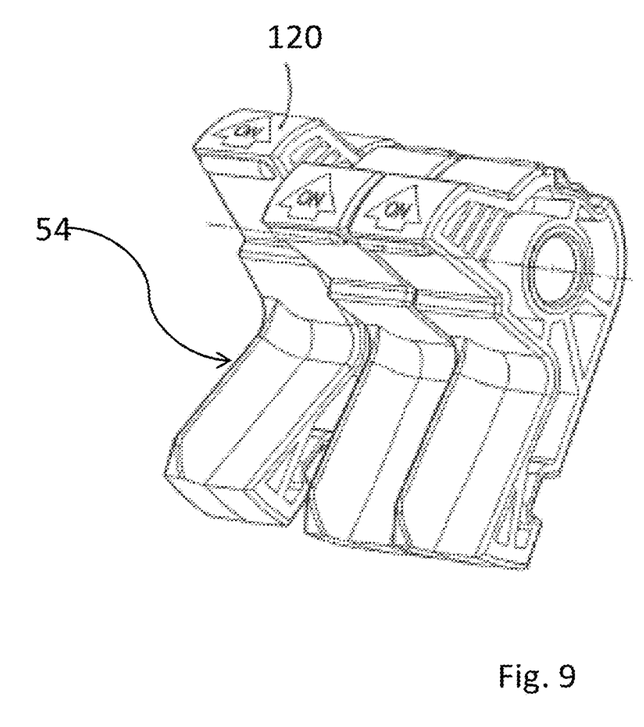
FIG. 9 shows the three switching levers from FIG. 8 in a perspective view from the front.

FIGS. 8 and 9 show a detailed view of three switching levers 54, switching recesses 62, 64 and the switching surface 60. A catch pocket 116 and a catch pin 118 (FIG. 8) are provided on one side of each of the adjusting arms 58. If a switching lever 54 is moved into its inactive, i.e., second switching position, the switching levers 54 arranged on the side of the catch pocket 116 are also moved into their second switching position. If a switching lever 54 is moved into its first switching position, i.e., into its active switching position, all of the switching levers 54 located on the side of the catch pin 118 are concomitantly moved into the first switching position. In this manner, it is possible to quickly engage or disengage with a few manipulations a plurality of pneumatic springs 50 (FIGS. 6-7) by means of one switching lever 54.

As shown in FIG. 9, upward movement of an actuation section 120 moves the corresponding adjusting arm 58 into contact with the pneumatic spring element 50 (FIGS. 6-7). As shown in FIGS. 6-9, engaging one or more pneumatic springs 50 makes it possible to cover a large weight range. As a result, an appropriate strength and/or number of pneumatic spring elements 50 can always be engaged to produce a corresponding spring excursion.

The invention claimed is:

1. An industrial truck with a drive part having a driver stand assembly, the driver stand assembly comprising:
    an L-shaped stand platform comprising
        a horizontally arranged floor element moveably mounted to a portion of an industrial truck by a swing arm, and
        a vertical wall element having at least one coupling element securely connected to the industrial truck;
    a spring element; and
    a switching lever positioned on the vertical wall element, wherein the switching lever engages the spring element in a first switching position and is freely movable relative to the spring element in a second switching position, and wherein in the first switching position, a spring force of the spring element acts on the L-shaped stand platform.

2. The industrial truck according to claim 1, wherein the stand platform is mounted by a suspension spring.

3. The industrial truck according to claim 1, wherein the spring element is a pneumatic spring.

4. The industrial truck according to claim 1, further comprising a position sensor configured to interact with the vertical wall element or the at least one coupling element.

5. The industrial truck according to claim 1, wherein the at least one coupling element is a guide roller.

6. The industrial truck according to claim 5, wherein a guide element is coupled to the industrial truck by a pair of side legs.

7. The industrial truck according to claim 1, wherein the switching lever comprises an adjustment arm which contacts the spring element in the first switching position to compress the spring element when the swing arm undergoes a resilient movement.

8. The industrial truck according to claim 7, further comprising a pressure piece configured to contact a first portion of the switching lever when the switching lever is in the first position and a second portion of the switching lever when the switching lever is in the second position.

9. The industrial truck according to claim 1, wherein the swing arm comprises at least one sidearm, and wherein one end of the at least one sidearm is articulated to a frame fixed to the industrial truck, and the other end of the at least one sidearm is articulated to the floor element.

10. The industrial truck according to claim 9, wherein the swing arm has two sidearms connected to each other by at least one transverse arm.

11. The industrial truck according to claim 1, wherein a second spring element is coupled to a portion of a frame and configured to interact with the L-shaped floor element.

12. The industrial truck according to claim 11, wherein the second spring element is a pneumatic spring.

13. The industrial truck according to claim 1, further comprising a position sensor configured to interact with the vertical wall element and the at least one coupling element to detect an unloaded and a loaded spring assembly.

14. The industrial truck according to claim 13, wherein the at least one coupling element is positioned below the position sensor.

15. The industrial truck according to claim 13, wherein the position sensor generates a deadman signal when it detects an unloaded spring element.

16. The industrial truck according to claim 1, further comprising two or more switching levers and respective spring elements.

17. The industrial truck according to claim 16, wherein the two or more switching levers are independently adjustable of other switching levers.

18. The industrial truck according to claim 17, wherein at least one of the two or more switching levers has a catch to permit one or more adjacent switching levers to be simultaneously adjusted.

* * * * *